Figure 1:
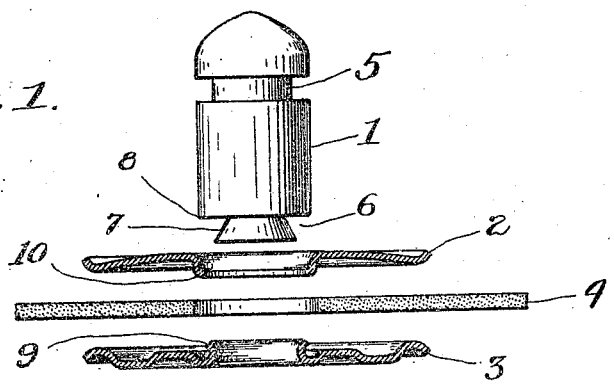

L. ARKIN.
FASTENER.
APPLICATION FILED JUNE 12, 1918.

1,296,254.

Patented Mar. 4, 1919.

Inventor
Louis Arkin
by Rohrts Rohrts & Cushman
his Attorneys

UNITED STATES PATENT OFFICE.

LOUIS ARKIN, OF BOSTON, MASSACHUSETTS.

FASTENER.

1,296,254.  Specification of Letters Patent.  Patented Mar. 4, 1919.

Application filed June 12, 1918. Serial No. 239,665.

*To all whom it may concern:*

Be it known that I, LOUIS ARKIN, citizen of the United States of America, and resident of Boston, in the county of Suffolk and State of Massachusetts, have invented new and useful Improvements in Fasteners, of which the following is a specification.

This invention relates to a connection between a central member and a surrounding member and more particularly to a connection between the stud of a snap fastener and the piece of material to which it is secured.

The principal object of the invention is to provide a method and means for quickly and securely fastening a central member such as the stud of a snap fastener to one or more other members such as the base members of a snap fastener which are adapted to clamp a piece of material therebetween. More particularly the primary object of the invention is easily and cheaply to fasten the stud of a snap fastener permanently and securely to a piece of fabric, leather or other material.

In one aspect the invention comprises a base member having an opening therein, a central member extending into the opening in the base member and having an annular recess in the region of the base member, and an annular flange on the base member extending into the recess, the annular flange being formed by outwardly folding the edge of the base member surrounding said opening. The annular recess preferably comprises a groove having one face substantially perpendicular to the axis of the stud and having the other face oblique to the axis of the groove so as to form a conical or tapered section on the stud and the stud is preferably smaller in diameter at the end of the tapered section than on the other side of the tapered section so that the perpendicular face con-groove stitutes a shoulder extending outwardly beyond the smaller diameter. When using the device as a snap fastener the central member comprises one of the fastener members, preferably the stud, and the base member comprises a thin disk or plate adapted to be secured to a piece of fabric, leather or other material.

When employing the device as a snap fastener I preferably provide two base members adapted to clamp the fabric or other material therebetween in which event the outwardly folding flange on the one base member, which extends into the annular recess in the central member, preferably folds over the inner edge of the other base member so as to lock the two base members together. Moreover the other base member preferably has its inner edge bent downwardly and inwardly to form a cupped flange into which the aforesaid shoulder on the central member is adapted to fit against the folded edge of the one base member.

In another aspect the invention consists of a method of securing a stud or other central member to a base member which comprises forming an annular recess in the stud, forming an opening in the base member, striking up the edge of the base member surrounding the opening to form a flange, the opening being just large enough to receive the stud after the edge is struck up, inserting the stud into the opening with the recess in the region of the flange, and then compressing the flange so as to force the flange into the recess. The flange on the base member is preferably so shaped that when it is compressed it folds outwardly and bulges into the stud recess. When the stud recess comprises a tapered section and a shoulder extending outwardly beyond the tapered section at the small end thereof the base member is preferably fitted over the tapered section with its flange butting against the shoulder and the flange is then preferably bulged into the recess by forcing it against the stud shoulder.

When employing a second base member the second member is preferably placed on the side of the material facing the stud shoulder with the flange on the first base member extending through the opening therein so that when the flange is folded outwardly by forcing it against the shoulder it will clamp the inner edge of the second member.

I have illustrated the preferred embodiment of my invention, as applied to a snap fastener in the accompanying drawings, in which—

Figure 2:
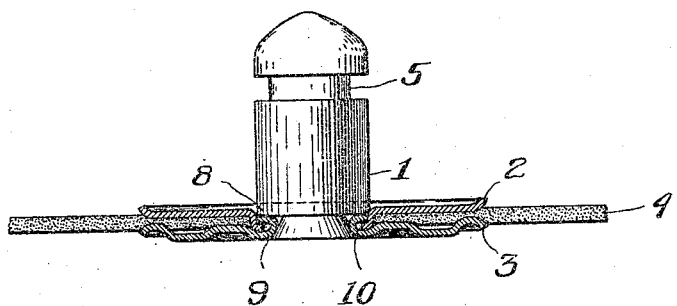

Figure 1 is a central longitudinal section of the fastener, the parts being shown in detached and separated relationship; and Fig. 2 is a view similar to Fig. 1 showing the parts in assembled and connected relationship.

The snap fastener illustrated in the drawings comprises a stud 1 and two base members 2 and 3 adapted to clamp therebetween the material 4 to which the stud is to be attached. As will be understood the stud is adapted to fit into a female member and as usual the stud is provided with a groove 5 adapted to coöperate with a lock on the female member to hold the two parts of the fastener together.

According to the present invention the stud is provided with an annular recess 6 for attaching it to the base member or members. The essential characteristic of this recess is that the portion of the stud below the recess has a diameter less than the diameter of the portion of the stud immediately above the recess so that the shoulder immediately above the recess will project radially beyond the lower end of the stud. In the particular embodiment of the invention illustrated in the drawings this is accomplished by providing a conical portion 7 which flares outwardly from the plane of the shoulder 8, the diameter of the larger end of the conical portion being smaller than the diameter of the shoulder.

The base member 3 is secured in the recess 6 by striking up the inner edge of the annular base member so as to produce a flange 9 which has an internal diameter just large enough to permit the conical portion 7 of the stud to be passed therethrough. To secure the base member 3 to the stud the conical portion 7 is inserted into the opening in the base member and the flange 9 is forced into the recess 7. This is preferably accomplished by compressing the flange vertically so as to cause it to bulge into the recess as illustrated in Fig. 2. I believe the most practical way of bulging the flange in the recess is to turn the flange 9 slightly outwardly as illustrated in Fig. 1 when forming the flange and then forcing the flange upwardly against the shoulder 8 of the stud when assembling the parts so as to fold the flange outwardly into the position shown in Fig. 2. This will cause the central portion of the flange to bulge into the recess as shown in Fig. 2.

While the material 4 may be secured solely to the base member 3, either by rivets or struck-up tongues or by extending the material under the out-turned flange 9, I prefer to employ the additional base member 2 so as to clamp the material 4 between the two members. When employing the base member 2 its inner edge is preferably disposed under the out-turned flange 9 of the base member 3. While the base member 2 may be entirely flat it is preferably shaped as shown in Fig. 1 with a cupped flange 10 provided at its inner edge. The lower inturned portion of this flange is adapted to lie under the out-turned flange 9 and the cupped flange is of sufficient depth to receive the shoulder 8 of the stud after the flange 9 has been folded outwardly, as illustrated in Fig. 2.

It will be apparent that the blanks shown in Fig. 1 must be of such dimensions that the tapered base 7 of the stud will pass through the opening in the base member 3 and the opening in the base member 2 must be large enough to permit the flange 9 to pass therethrough prior to its being bent outwardly.

While the recess 6 might be made in the form of a smoothly rounding groove of proper shape to receive the out-turned flange 9 when bent into the form shown in Fig. 2, I prefer to form the recess 6 as illustrated in the drawings for the reason that the acute-angled recess affords a space into which the flange 9 may be forced in the event that it is somewhat too long; that is, if the flange 9 is made of such length that when folded outwardly it could not assume the circular cross-sectional contour shown in Fig. 2, it would bulge into the bottom of the acute-angled recess and assume a cross-sectional shape more or less similar to the acute-angled recess. In fact, the flange 9 is preferably made somewhat longer than necessary so that it will be forced fairly deeply into the acute-angled recess and thereby be secured more firmly to the stud.

I claim:

1. The method of securing a stud in a base member which comprises forming an annular recess in the stud, forming an opening in the base member, striking up the edge of the base member surrounding the opening to form a flange, the opening being large enough to receive the stud after the edge is struck up, inserting the stud into the opening with the recess in the region of the flange, and then compressing the flange so as to force the flange into the recess.

2. The method of securing a stud in a base member which comprises forming an annular recess in the stud, forming an opening in the base member, striking up the edge of the base member surrounding the opening to form a flange, the opening being large enough to receive the stud after the edge is struck up, inserting the stud into the opening with the recess in the region of the flange, and then folding the flange outwardly so as to bulge the flange into the recess.

3. The method of securing a stud in a base member which comprises forming in the stud a tapered portion with a shoulder at the small end thereof, forming an opening in the base member with a struck-up flange therearound, the opening being just large enough to receive the tapered portion of the stud, inserting the stud into the opening until said flange engages said shoulder, and then forcing the flange against the shoulder, so as to force the flange into the recess between the shoulder and tapered portion of the stud.

4. The method of securing a stud in a base member which comprises forming in the stud a tapered portion with a shoulder at the small end thereof, forming an opening in the base member with an out-turned flange therearound, the opening being just large enough to receive the tapered portion of the stud, inserting the stud into the opening until said flange engages said shoulder, and then forcing the flange against the shoulder so as to fold the flange outwardly and bulge the flange into the recess between the shoulder and tapered portion of the stud.

5. The method of securing a snap fastener to a piece of material which comprises forming an annular recess in the fastener, forming a base member with an opening therein, forming a second base member with a struck-up flange surrounding an opening therein, the opening in the first member being just large enough to receive the flange of the second member and the opening in the second member being just large enough to receive the fastener, forming an opening in the material large enough to receive said flange, placing said two members on opposite sides of the material with said flange extending through the openings in the material and first member, inserting the fastener into said openings with said recess disposed in the region of said flange, and folding the flange outwardly over the inner edge of the first member so as to bulge the flange into said recess, thereby locking the parts together.

6. The method of securing the stud of a snap fastener to a piece of material which comprises forming on the stud a conical base of reduced diameter, forming a base member with an opening therein, forming a second base member with an out-turned flange surrounding an opening therein, the opening in the first member being just large enough to receive the flange of the second member and the opening in the second member being just large enough to receive the said conical base, forming an opening in the material large enough to receive said flange, placing said two members on opposite sides of the material with said flange extending through the openings in the material and first member, inserting said conical base into said openings with the bottom of the stud engaging said flange, and then forcing the flange against the bottom of the stud so as to fold the flange outwardly over the inner edge of said first member and so as to bulge the flange into the recess between said tapered base and the bottom of the stud, thereby locking the parts together.

7. In a device of the character described the combination of a thin base member having an opening therein, a central member extending into the opening in the base member and having an annular recess in the region of the base member, and an annular flange on the base member extending into said recess, said annular flange being formed by outwardly folding the edge of the base member surrounding said opening.

8. In a device of the character described the combination of a base member having an opening therein, a central member having a tapered section and having a shoulder at the small end of the tapered section, and the base member having an outwardly folded flange extending into the recess between said tapered section and said shoulder.

9. A stud member of a fastener comprising a stud having a peripheral recess therein, and two base members adapted to clamp a piece of material therebetween, said members having openings to receive the stud and the inner edge of one of the members being folded outwardly over the inner edge of the other member with the fold extending into said recess.

10. A stud member of a fastener comprising two base members adapted to clamp a piece of material therebetween, said member having coaxial openings therethrough, the inner edge of the upper member being bent downwardly and then inwardly to form a cupped flange and the inner edge of the lower member being folded outwardly over said flange, and a stud having a shoulder fitting into the cup of the upper member against the folded edge of the lower member, the stud flaring outwardly beneath said folded edge.

Signed by me at Boston, Massachusetts, this eighth day of June, 1918.

LOUIS ARKIN.

Copies of this patent may be obtained for five cents each, by addressing the "Commissioner of Patents, Washington, D. C."